United States Patent
Nakamura et al.

(10) Patent No.: US 9,869,890 B2
(45) Date of Patent: Jan. 16, 2018

(54) POLARIZATION INDEPENDENT OPTICAL ISOLATOR

(71) Applicant: SUMITOMO METAL MINING CO., LTD., Tokyo (JP)

(72) Inventors: Nobuo Nakamura, Ome (JP); Kinya Oigawa, Noshiro (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/892,663

(22) PCT Filed: Apr. 30, 2014

(86) PCT No.: PCT/JP2014/061954
§ 371 (c)(1),
(2) Date: Nov. 20, 2015

(87) PCT Pub. No.: WO2015/004976
PCT Pub. Date: Jan. 15, 2015

(65) Prior Publication Data
US 2016/0109735 A1   Apr. 21, 2016

(30) Foreign Application Priority Data
Jul. 10, 2013   (JP) ................. 2013-144721

(51) Int. Cl.
*G02F 1/09*   (2006.01)
*G02B 27/28*   (2006.01)

(52) U.S. Cl.
CPC .......... *G02F 1/093* (2013.01); *G02B 27/286* (2013.01); *G02F 2203/06* (2013.01)

(58) Field of Classification Search
None
See application file for complete search history.

(56) References Cited

U.S. PATENT DOCUMENTS

| | | | |
|---|---|---|---|
| 2012/0294565 A1 | 11/2012 | Iida | |
| 2014/0016199 A1* | 1/2014 | Dongling | G02B 5/30 359/494.01 |

FOREIGN PATENT DOCUMENTS

| | | |
|---|---|---|
| JP | 2001-242418 A1 | 9/2001 |
| JP | 2004-61954 A1 | 2/2004 |

(Continued)

OTHER PUBLICATIONS

International Search Report for International Application No. PCT/JP2014/061954 dated Jul. 1, 2014.

*Primary Examiner* — Derek S Chapel
(74) *Attorney, Agent, or Firm* — Kratz, Quintos & Hanson, LLP

(57) ABSTRACT

[Object] To provide a polarization independent optical isolator enabling downsizing of a Faraday element and a magnet. [Solving means] The polarization independent optical isolator comprises: a pair of wedge-shaped birefringent crystal plates (1, 2) provided in an optical path; and a Faraday element (30) made of a paramagnetic body and provided in the optical path between the wedge-shaped birefringent crystal plates. The pair of wedge-shaped birefringent crystal plates have inclined light-transmitting surfaces parallel to each other and non-inclined light-transmitting surfaces parallel to each other. The non-inclined light-transmitting surfaces are disposed to face the Faraday element. The polarization independent optical isolator is characterized in that: the paramagnetic body constituting the Faraday element has such a parallelogrammic cross section that light incident-emitting surfaces of the paramagnetic body are not parallel to the non-inclined light-transmitting surfaces of the pair of wedge-shaped birefringent crystal plates; and a right-angled portion (100) of each of the wedge-shaped birefringent crystal plates and a correspond- (Continued)

ing obtuse-angled portion (31) of the Faraday element are disposed on the same side with respect to an optical path central axis.

2 Claims, 4 Drawing Sheets

(56) References Cited

FOREIGN PATENT DOCUMENTS

| | | |
|---|---|---|
| JP | 2007-256616 A1 | 10/2007 |
| JP | 2009-168894 A1 | 7/2009 |
| JP | 2012-242591 A1 | 12/2012 |

* cited by examiner

POLARIZATION INDEPENDENT OPTICAL ISOLATOR

TECHNICAL FIELD

The present invention relates to an optical isolator utilized as a countermeasure against reflected return light of a high-power laser used in an optical communications system and a laser processing system. Particularly, the present invention relates to an improvement in a polarization independent optical isolator capable of downsizing a Faraday element and a magnet, which are components of the optical isolator.

BACKGROUND ART

In a laser element such as a semiconductor laser used in an optical communications system or a solid-state laser used in a laser processing system, when light reflected by an optical surface or a work surface outside a laser resonator returns to the laser element, the laser oscillation is destabilized. The destabilized laser oscillation causes noise in a signal in an optical communications system, or may destroy the laser element in a laser processing system. Accordingly, an optical isolator is used to block such reflected return light, preventing the reflected return light from returning to the laser element.

Meanwhile, there is known a polarization independent optical isolator comprising as main components as shown in FIG. 1: a pair of wedge-shaped birefringent crystal plates 1, 2; a Faraday element 3 provided between the wedge-shaped birefringent crystal plates 1, 2 and made of a paramagnetic body having a rectangular cross section; and a permanent magnet 5 (see Patent Document 1). Note that a solid line in FIG. 1 shows how laser light travels in a forward direction.

Moreover, in this type of polarization independent optical isolator, for example, laser light (incident light) in the forward direction having been emitted from a laser element (not shown) and passed through a lens 4 enters the wedge-shaped birefringent crystal plate 1, and is split into an ordinary ray and an extraordinary ray, so that the rays proceed in two optical paths, respectively, and enter the Faraday element 3. After the Faraday element 3 rotates the planes of polarization by 45°, the rays enter the wedge-shaped birefringent crystal plate 2 and exit from the optical isolator in such a state that the rays are again parallel to the laser light (incident light).

On the other hand, when laser light travels in a reserve direction (i.e., when return light travels), the light enters the wedge-shaped birefringent crystal plate 2 from an emission side of the optical isolator (the right side of FIG. 1), and follows the same path as that taken when traveling in the forward direction until the light reaches the wedge-shaped birefringent crystal plate 1. When emitted from the wedge-shaped birefringent crystal plate 1, the light travels as if bypassing the lens 4 (i.e., as shown by the broken lines). In other words, the return light is never coupled into the lens 4, and thus the optical isolator can function.

Note that, in FIG. 1, reference sign γ denotes a wedge angle of each of the wedge-shaped birefringent crystal plates 1 and 2, whereas reference sign β denotes an angle formed between the return light and the incident light.

Conventional Art Document

PATENT DOCUMENT

Patent Document 1: Japanese Patent Application Publication No. 2009-168894 (see paragraph 0003)

SUMMARY OF THE INVENTION

Problems to be Solved by the Invention

By the way, in such a conventional polarization independent optical isolator employing the Faraday element having a rectangular cross section, laser light incident on the wedge-shaped birefringent crystal plate 1 then passes through the wedge-shaped birefringent crystal plate 1. After that, while traveling in an oblique direction as shown in FIG. 1, the laser light enters the Faraday element 3. For this reason, the Faraday element 3 has to have a sufficiently larger diameter than the beam diameter of the laser light.

To be more specific, a length L of a Faraday element is calculated according a mathematical equation:

$L$=Faraday rotation angle $(45°)\div(V\times H)$, where

V represent the Verdet constant of the Faraday element, and

H represent the intensity of a magnetic field applied to the Faraday element.

In other words, the higher the intensity H of the magnetic field, the shorter the length L of the Faraday element. It has been confirmed that, in this case, the structure of the polarization independent optical isolator shown in FIG. 1 allows the Faraday element to have a small diameter.

Nevertheless, if the intensity H of the magnetic field is low, the length L of the Faraday element is increased. Hence, it is necessary to set the diameter of the Faraday element large.

At present, small and inexpensive optical isolators are strongly demanded. As a way to satisfy this demand, the sizes of a Faraday element and a magnet, which are expensive components of optical isolators, need to be reduced. Specifically, this is because: a terbium-based paramagnetic body is used for the Faraday element, thereby increasing the material cost; moreover, regarding the magnet, the use of a dysprosium dispersed neodymium-iron-boron magnet also increases the material cost.

However, reducing the size of the Faraday element (i.e., reducing the length and the diameter of the Faraday element) results in a need for a large and strong magnet as described above. Meanwhile, reducing the size of the magnet weakens the magnetic field intensity. To compensate this loss, the length and the diameter of the Faraday element have to be increased. It has been quite difficult to achieve downsizing of both the Faraday element and the magnet.

The present invention has been made in view of such problems as described above. An object of the present invention is to provide a polarization independent optical isolator enabling downsizing of a Faraday element and a magnet.

Means for Solving the Problems

Accordingly, the present inventors have earnestly studied to achieve the above object. As a result, the inventors have found out that downsizing of both a Faraday element and a magnet can be achieved by using a Faraday element having a parallelogrammic cross section instead of a conventional Faraday element having a rectangular cross section.

Specifically, a first aspect according to the present invention is a polarization independent optical isolator comprising: a pair of wedge-shaped birefringent crystal plates provided in an optical path; and a Faraday element made of a paramagnetic body and provided in the optical path between the wedge-shaped birefringent crystal plates, the pair of wedge-shaped birefringent crystal plates having inclined light-transmitting surfaces parallel to each other and non-inclined light-transmitting surfaces parallel to each other, and the non-inclined light-transmitting surfaces disposed to face the Faraday element, characterized in that the paramagnetic body constituting the Faraday element has such a parallelogrammic cross section that light incident-emitting surfaces of the paramagnetic body are not parallel to the non-inclined light-transmitting surfaces of the pair of wedge-shaped birefringent crystal plates, and a right-angled portion of each of the wedge-shaped birefringent crystal plates and a corresponding obtuse-angled portion of the Faraday element are disposed on the same side with respect to an optical path central axis.

Moreover, a second aspect of the present invention is the polarization independent optical isolator according to the first aspect, characterized in that the wedge-shaped birefringent crystal plates each have a wedge angle γ set to from 8° or more to 10° or less.

Effects of the Invention

In the polarization independent optical isolator according to the present invention, the paramagnetic body constituting the Faraday element has such a parallelogrammic cross section that the light incident-emitting surfaces are not parallel to the non-inclined light-transmitting surfaces of the pair of wedge-shaped birefringent crystal plates, and the right-angled portion of each of the wedge-shaped birefringent crystal plates and the corresponding obtuse-angled portion of the Faraday element are disposed on the same side with respect to the optical path central axis. Accordingly, laser light, which passes through the wedge-shaped birefringent crystal plate and travels in a direction away from the optical path central axis, is refracted when entering the Faraday element, so that the laser light travels in a returning direction toward the optical path central axis. This makes it possible to reduce the diameter of the Faraday element in comparison with a conventional Faraday element having a rectangular cross section.

Thus, the present invention has such an effect of enabling downsizing of both a Faraday element and a magnet in an polarization independent optical isolator.

MODES FOR PRACTICING THE INVENTION

Hereinafter, embodiments according to the present invention will be described in detail using the drawings.

Figure 2:
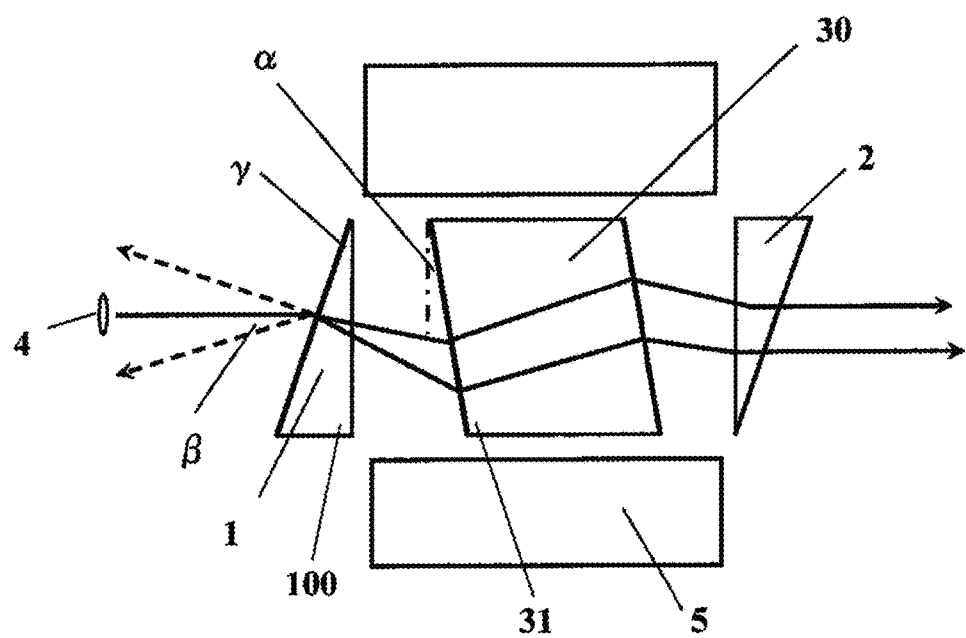
FIG. 2 is an explanatory drawing showing a schematic configuration of a polarization independent optical isolator according to the present invention, and optical paths of laser light in the optical isolator.

FIG. 2 is an explanatory drawing showing a schematic configuration of a polarization independent optical isolator according to the present invention, and optical paths of laser light (how the light travels) in the optical isolator.

First of all, the polarization independent optical isolator according to the present invention is a polarization independent optical isolator comprising: a pair of wedge-shaped birefringent crystal plates 1, 2 provided in an optical path as shown in FIG. 2; and a Faraday element 30 made of a paramagnetic body and provided in the optical path between the wedge-shaped birefringent crystal plates 1, 2. The pair of wedge-shaped birefringent crystal plates 1, 2 have inclined light-transmitting surfaces parallel to each other and non-inclined light-transmitting surfaces parallel to each other. The non-inclined light-transmitting surfaces are disposed to face the Faraday element 30. The polarization independent optical isolator is characterized in that the paramagnetic body constituting the Faraday element 30 has such a parallelogrammic cross section that light incident-emitting surfaces of the paramagnetic body are not parallel to the non-inclined light-transmitting surfaces of the pair of wedge-shaped birefringent crystal plates 1, 2, and that a right-angled portion 100 of each of the wedge-shaped birefringent crystal plates 1, 2 and a corresponding obtuse-angled portion 31 of the Faraday element 30 are disposed on the same side with respect to an unillustrated optical path central axis.

Figure 1:
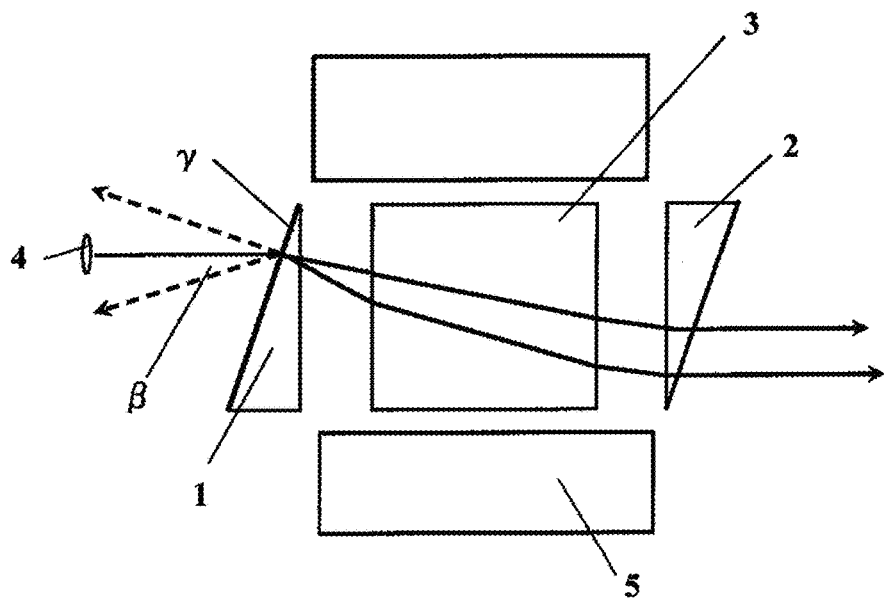
FIG. 1 is an explanatory drawing showing a schematic configuration of a polarization independent optical isolator according to a conventional example employing a Faraday element having a rectangular cross section, and optical paths of laser light in the optical isolator.

Note that if the wedge-shaped birefringent crystal plates 1, 2 in FIGS. 1 and 2 have small γ (wedge angle of the wedge-shaped birefringent crystal plates 1 and 2), it is likely that return light is coupled into a lens 4. For this reason, β (angle formed between the return light and incident light) is preferably β≥1.7°. To satisfy this, the wedge angle γ is preferably 8° or more.

Hereinbelow, described is a simulation performed to find out how laser light travels (optical paths) in the polarization independent optical isolator by setting the length of the Faraday element to 14 mm, and the wedge angle γ of the pair of wedge-shaped birefringent crystal plates 1, 2 to 8°. The graph in FIG. 3 shows the result.

Figure 3:
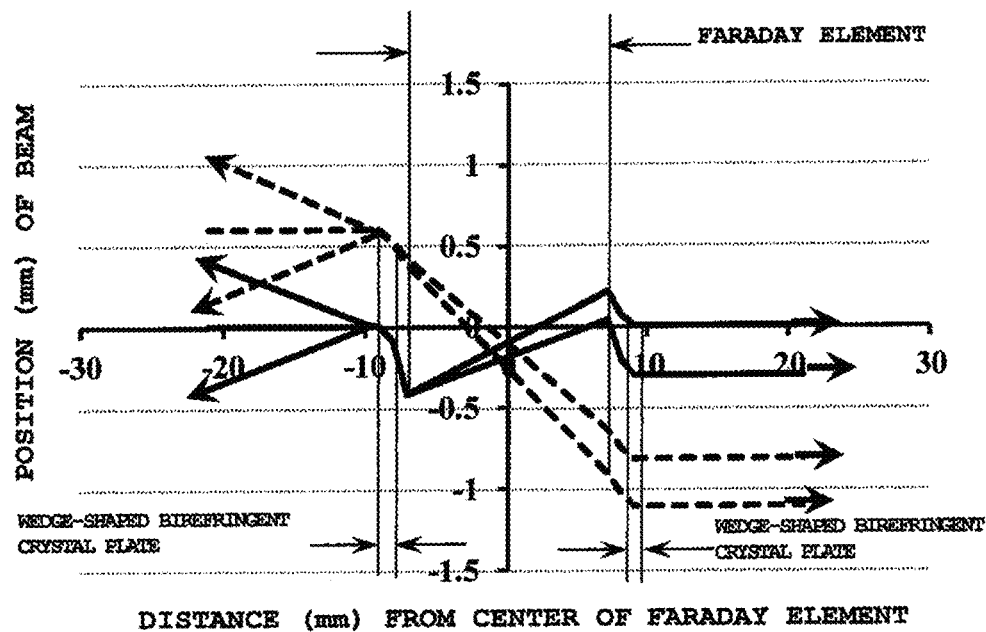
FIG. 3 is a laser light simulation graph for schematically illustrating the optical paths of laser light (how the light travels) in the polarization independent optical isolator.

Note that a solid line in FIG. 3 shows an optical path of laser light (how the light travels) in the polarization independent optical isolator according to the present invention (which employs the Faraday element having the parallelogrammic cross section with an angle denoted by reference sign α in FIG. 2 set to 14°). Moreover, a broken line in FIG. 3 shows an optical path of laser light (how the light travels) in the polarization independent optical isolator according to the conventional example employing a Faraday element having a rectangular cross section.

As can be seen from the simulation graph in FIG. 3, in the polarization independent optical isolator according to the conventional example, incident laser light in a forward direction based on an optical path central axis (not shown) travels in a way that the light markedly shifts from a light entering position as shown by the broken lines. In contrast, in the polarization independent optical isolator according to the present invention, incident laser light in the forward direction based on the optical path central axis (not shown) does not markedly shift from a light entering position as shown by the solid lines. Thus, it can be understood that the polarization independent optical isolator according to the present invention sufficiently functions using a Faraday element having a small diameter. Further, in the case where incident laser light in the forward direction based on the optical path central axis (not shown) does not markedly shift from the light entering position, it is also possible to reduce the inner diameter of a magnet incorporated into the optical isolator, and the intensity of a magnetic field applied to the Faraday element can be increased. In other words, it is possible to reduce the size of the magnet without changing the length of the Faraday element.

Figure 4:
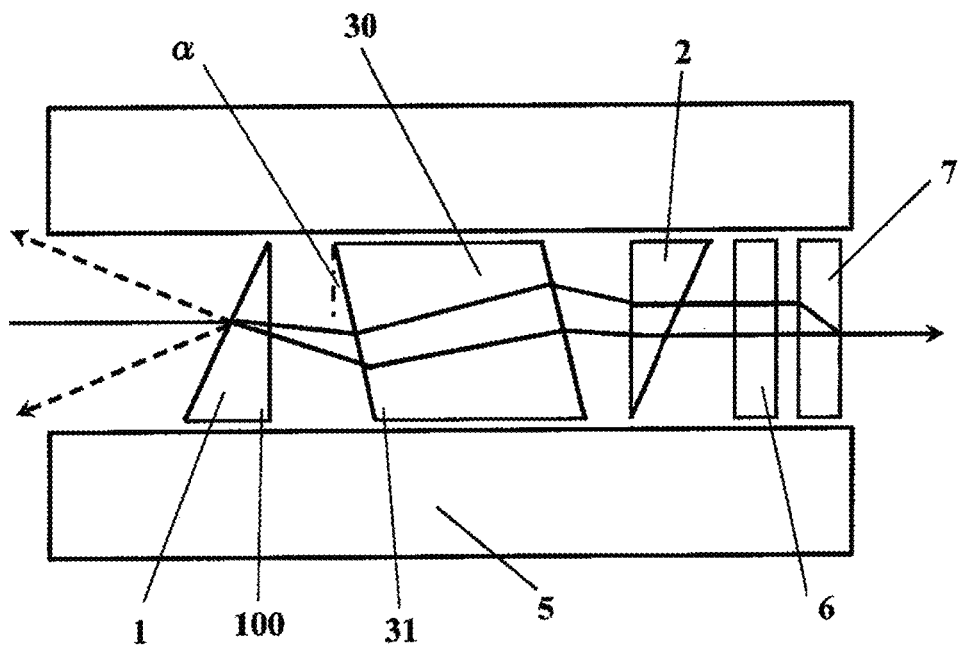
FIG. 4 is an explanatory drawing showing a schematic configuration of a polarization independent optical isolator according to Example, and optical paths of laser light in the optical isolator.

Meanwhile, as understood from FIGS. 2 and 3, the angle denoted by the reference sign α in FIG. 2 depends on the wedge angle γ of the wedge-shaped birefringent crystal plates 1, 2. When the angle γ is increased, the angle denoted by the reference sign α needs to be increased accordingly. However, when the angle γ is increased, the angle β formed between return light and incident light is also increased. Hence, the return light hits an inner wall of the magnet as shown in FIG. 4, increasing the temperature of the magnet; in addition, a problem is likely to arise that after reflected in the magnet, the return light reaches the lens 4 as stray light. For this reason, the wedge-shaped birefringent crystal plates 1, 2 preferably have a wedge angle γ of 10° or less, and the angle denoted by the reference sign α in FIG. 2 is 20° or less accordingly.

EXAMPLES

Hereinafter, Example of the present invention will be described specifically together with Comparative Example.

Example

A polarization independent optical isolator according to Example includes as main components as shown in FIG. 4: a pair of wedge-shaped birefringent crystal plates 1, 2: a Faraday element 30 having a parallelogrammic cross section and provided between the wedge-shaped birefringent crystal plates 1, 2; a magnet assembly 5; a quartz half-wave plate 6; and a parallel plate-shaped YVO$_4$crystal 7.

Figure 5:
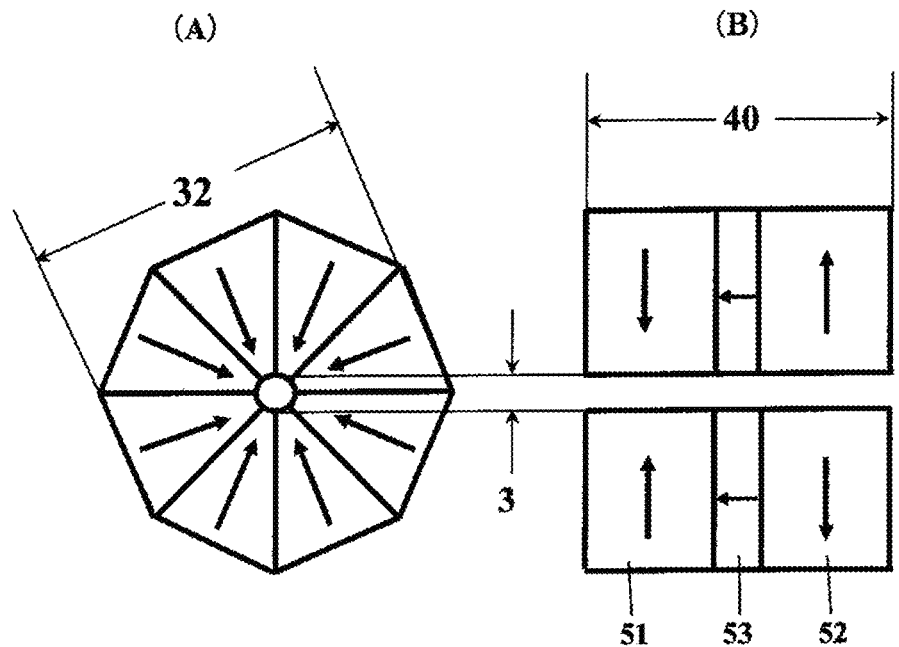
FIG. 5(A) is a schematic cross-sectional view of magnets employed in the polarization independent optical isolator according to Example.
FIG. 5(B) is a cross-sectional view of a configuration of the magnets.

First, as shown in FIG. 5(B), the magnet assembly 5 includes: a first magnet 51 magnetized in a direction oriented toward the above-described optical path central axis (not shown), the magnetization direction (directions indicated by the arrows) being perpendicular to the optical path central axis; a second magnet 52 magnetized in a direction oriented away from the optical path central axis, the magnetization direction (directions indicated by the arrows) being perpendicular to the optical path central axis; and a third magnet 53 disposed between the first magnet 51 and the second magnet 52, and magnetized in a direction from the second magnet 52 to the first magnet 51, the magnetization direction (direction indicated by the arrows) being parallel to the optical path central axis. At the center of each of the first, the second magnet, and the third magnet, a hole is provided to house the Faraday element 30 therein.

Note that each of the first magnet 51, the second magnet 52, and the third magnet 53 is constituted of a neodymium-iron-boron magnet. The magnet assembly 5 formed by combining these magnets had a length of 40 mm as shown in FIG. 5(B). The magnet assembly 5 had an outer diameter of 32 mm as shown in FIG. 5(A). The hole in each magnet was set to have an inner diameter of 3 mm.

Moreover, a terbium-gallium-garnet rod having a parallelogrammic cross section, a diameter of 2.6 mm, and a length of 12 mm was used as the Faraday element 30, in which the angle denoted by the reference sign α in FIG. 2 was 14°. A YVO$_4$crystal having a wedge angle γ of 8.5° was used as the wedge-shaped birefringent crystal plates 1, 2.

Further, the quartz half-wave plate 6 and the parallel plate-shaped YVO$_4$crystal 7 were added in order to converge an ordinary ray and an extraordinary ray having passing through the wedge-shaped birefringent crystal plate 2 in the forward direction.

Note that the dimensions of the wedge-shaped birefringent crystal plates 1, 2, the Faraday element 30, the magnet assembly 5, and so on had been calculated through a simulation in advance.

Figure 6:
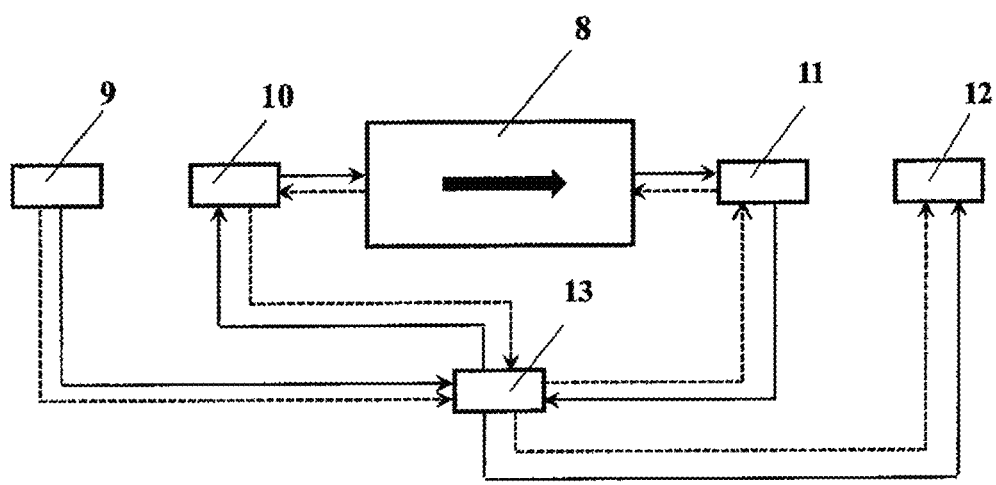
FIG. 6 is an explanatory drawing showing a schematic configuration of an isolation measurement system for the polarization independent optical isolator according to Example and a polarization independent optical isolator according to Comparative Example.

Then, the polarization independent optical isolator according to Example was measured for an isolation using an isolation measurement system shown in FIG. 6.

Note that the isolation measurement system shown in FIG. 6 includes: a semiconductor laser light source 9 with a wavelength of 1060 nm; fiber collimators 10, 11; a power meter 12, and an optical switch 13. A polarization independent optical isolator 8 as a measurement target is disposed between the fiber collimators 10, 11. Additionally, the distance between the polarization independent optical isolator 8 and each of the fiber collimators 10, 11 is 50 mm.

Further, in the isolation measurement for the polarization independent optical isolator, laser light was emitted from the semiconductor laser light source 9 in the forward direction as shown by the solid line, and entered the polarization independent optical isolator 8 via the optical switch 13 and the fiber collimator 10. Then, the laser light was emitted from the polarization independent optical isolator 8 as shown by the solid line, and entered the power meter 12 via the fiber collimator 11 and the optical switch 13 to obtain a value $I_f$ at the power meter 12.

Next, laser light was emitted from the semiconductor laser light source 9 in the reserve direction as shown by the broken line, and entered the polarization independent optical isolator 8 via the optical switch 13 and the fiber collimator 11. Then, the laser light was emitted from the polarization independent optical isolator 8 as shown by the broken line, and entered the power meter 12 via the fiber collimator 10 and the optical switch 13 to obtain a value $I_b$ at the power meter 12.

After that, $-10 \cdot \log(I_b/I_f)$ was calculated as an isolation from the value $I_f$ and the value $I_b$ each of which was measured at the power meter 12.

The measurement result verified that the polarization independent optical isolator according to Example had a favorable isolation value of 40 dB or more.

Comparative Example

A polarization independent optical isolator according to Comparative Example including a Faraday element 30 having a different shape from that of the polarization independent optical isolator according to Example shown in FIG. 4 was obtained in the same manner as in Example, except that the Faraday element having a rectangular cross section was employed in place of the Faraday element having the parallelogrammic cross section.

Figure 7:
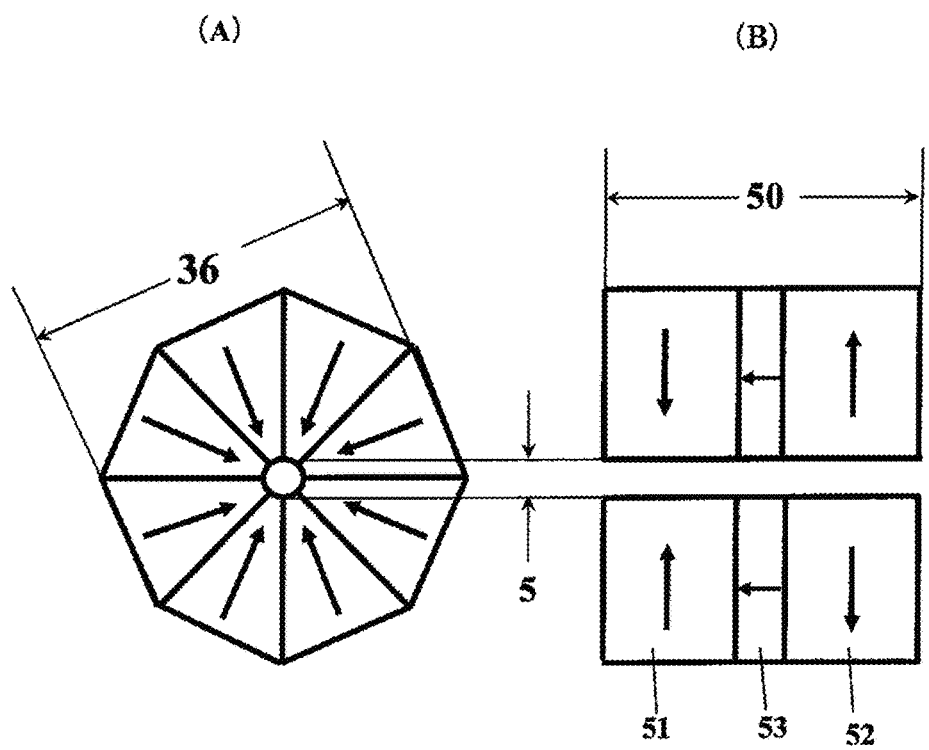
FIG. 7(A) is a schematic cross-sectional view of magnets employed in the polarization independent optical isolator according to Comparative Example.
FIG. 7(B) is a cross-sectional view of a configuration of the magnets.

Note that, as shown in FIG. 7(B), the magnet assembly 5 used was an assembly of the first magnet 51, the second magnet 52, and the third magnet 53 each of which was constituted of a neodymium-iron-boron magnet. The magnet assembly 5 had a length of 50 mm as shown in FIG. 7(B). The magnet assembly 5 had an outer diameter of 36 mm as shown in FIG. 7(A). The hole in each magnet was set to have an inner diameter of 5 mm.

Moreover, a terbium-gallium-garnet rod having a rectangular cross section, a diameter of 4.3 mm, and a length of 12 mm was used as the Faraday element 30. A $YVO_4$ crystal having a wedge angle γ of 8.5° was used as the wedge-shaped birefringent crystal plates 1, 2.

Note that the dimensions of the wedge-shaped birefringent crystal plates 1, 2, the Faraday element 30, the magnet assembly 5, and so on had been calculated through a simulation in advance as in Example.

Then, the obtained polarization independent optical isolator according to Comparative Example was measured for an isolation as in Example. As a result, the optical isolator had a favorable value of 40 dB or more.

Next, in order to downsize the polarization independent optical isolator according to Comparative Example, the value of the diameter of the Faraday element 30 was set sequentially smaller from 4.3 mm, and each optical isolator was measured for an isolation.

As a result of the measurement, the isolation was decreased: 35 dB for the Faraday element 30 having a diameter of 4.1 mm; and 30 dB for the Faraday element 30 having a diameter of 4.0 mm.

The cause of the decreased isolation was that a sufficient Faraday rotation angle was not obtained because a portion of return light, which was shifted from the optical path central axis, reached a side surface of the Faraday element as a result of setting the value of the diameter of the Faraday element 30 sequentially smaller from 4.3 mm. This revealed that in the case where a Faraday element having a rectangular cross section is employed in place of a Faraday element having a parallelogrammic cross section, the Faraday element 30 needs to have a diameter of 4.3 mm as simulated.

[Verification]

From the above results, employing a Faraday element having a parallelogrammic cross section in which the angle denoted by the reference sign α in FIG. 2 is 14° in place of a Faraday element having a rectangular cross section made the volume of the Faraday element "approximately 1/3," and the volume of the magnet assembly "approximately 2/3." This verified that the polarization independent optical isolator is capable of downsizing both the Faraday element and the magnet.

POSSIBILITY OF INDUSTRIAL APPLICATION

The polarization independent optical isolator according to the present invention is capable of downsizing the Faraday element and the magnet. Thus, the polarization independent optical isolator according to the present invention has such an industrial applicability that it is utilizable as a countermeasure against reflected return light of a high-power laser used in an optical communications system and a laser processing system.

REFERENCE SIGNS LIST

1: wedge-shaped birefringent crystal plates
2: wedge-shaped birefringent crystal plates
3: Faraday element
4: lens
5: magnet
6: quartz half-wave plate
7: parallel plate-shaped $YVO_4$ crystal
8: polarization independent optical isolator
9: semiconductor laser light source
10: fiber collimator
11: fiber collimator
12: power meter
13: optical switch
30: Faraday element
31: obtuse-angled portion
51: first magnet
52: second magnet
53: third magnet
100: right-angled portion

The invention claimed is:

1. A polarization independent optical isolator, comprising: a pair of wedge-shaped birefringent crystal plates provided in an optical path; and a Faraday element made of a paramagnetic body and provided in the optical path between the wedge-shaped birefringent crystal plates, the pair of wedge-shaped birefringent crystal plates having inclined light-transmitting surfaces parallel to each other and non-inclined light-transmitting surfaces parallel to each other, and the non-inclined light-transmitting surfaces disposed to face the Faraday element, wherein
the paramagnetic body constituting the Faraday element has such a parallelogrammic cross section that light incident-emitting surfaces of the paramagnetic body are not parallel to the non-inclined light-transmitting surfaces of the pair of wedge-shaped birefringent crystal plates,
a right-angled portion of each of the wedge-shaped birefringent crystal plates and a corresponding obtuse-angled portion of the Faraday element are disposed on the same side with respect to an optical path central axis, and
the wedge-shaped birefringent crystal plates each having a wedge angle γ set to from 8° or more to 10° or less, and
a quartz half-wave plate and a parallel plate-shaped $YVO_4$ crystal are provided for converging an ordinary ray and an extraordinary ray in a forward direction, which have passed through the wedge-shaped birefringent crystal plate disposed on an emission side in the forward direction.

2. The polarization independent optical isolator according to claim 1, further comprising a magnet assembly including a hole having an inner diameter of 3 mm,
wherein the pair of wedge-shape birefringent crystal plates, the Faraday element having the parallelogrammic cross-section, the quartz half-wave plate, and the parallel plate-shaped $YVO_4$ crystal are housed in the hole.

* * * * *